US007715973B2

(12) United States Patent
Erol

(10) Patent No.: US 7,715,973 B2
(45) Date of Patent: May 11, 2010

(54) METHOD AND DEVICE FOR CONTROLLING AN INTERNAL COMBUSTION ENGINE

(75) Inventor: Baris Erol, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 47 days.

(21) Appl. No.: 12/164,261

(22) Filed: Jun. 30, 2008

(65) Prior Publication Data

US 2009/0024297 A1 Jan. 22, 2009

(30) Foreign Application Priority Data

Jun. 6, 2007 (DE) ....................... 10 2007 026 408
Jul. 6, 2007 (DE) ....................... 10 2007 031 484

(51) Int. Cl.
*F02D 45/00* (2006.01)
*G06F 19/00* (2006.01)

(52) U.S. Cl. ........................................................ 701/102

(58) Field of Classification Search ................. 701/102, 701/101, 110, 114, 115
See application file for complete search history.

(56) References Cited

U.S. PATENT DOCUMENTS 5,121,604 A 6/1992 Berger et al. .................. 60/602
6,751,544 B2 * 6/2004 Hashimoto et al. .......... 701/107

FOREIGN PATENT DOCUMENTS

| | | |
|---|---|---|
| DE | 3880146 | 5/1988 |
| DE | 102005001962 | 1/2005 |
| DE | 102005047590 | 10/2005 |

* cited by examiner

*Primary Examiner*—Hieu T Vo
(74) *Attorney, Agent, or Firm*—King & Spalding L.L.P

(57) ABSTRACT

In a method and a device for controlling an internal combustion engine (1) an optimized power yield of the internal combustion engine is made possible. In this case the internal combustion engine (1) is operated, depending on a criterion, either in a normal mode in which the maximum torque produced of the internal combustion engine (1) is restricted to a normal limit value or is operated in a power mode in which the maximum torque produced is restricted to a power limit value which is greater than the normal limit value. At least one operating variable of the internal combustion engine (1) is detected which is representative of its combustion power and the operation of the internal combustion engine (1) in the power mode is undertaken depending this at least one operating variable.

20 Claims, 3 Drawing Sheets

METHOD AND DEVICE FOR CONTROLLING AN INTERNAL COMBUSTION ENGINE

CROSS-REFERENCE TO RELATED APPLICATIONS

This application claims priority to German Patent Application Number 10 2007 031 484.3 filed on Jul. 6, 2007, and which is incorporated herein by reference in its entirety.

TECHNICAL FIELD

The invention relates to a method and a device for controlling an internal combustion engine, with the internal combustion engine, depending on a criterion, either being operated in a normal mode in which the maximum torque generated by the internal combustion engine is restricted to a normal limit value or being operated in a power mode in which the maximum torque generated is limited to a power limit value which is greater than the normal limit value.

BACKGROUND

Control methods or control devices of this type are preferably used in supercharged internal combustion engines. In such engines, if an increased torque is requested by the driver, the maximum permitted torque or power output of the internal combustion engine is increased for a short period. This type of operation of the internal combustion engine is also referred by the terms “overboost” or “overdrive” operation. Frequently this phase of the higher torque or power output is only available for a fixed predetermined period of time, which means that either the power potential of the internal combustion engine is only insufficiently exploited or, in the event of an fault, for example through “knocking”, damage to the engine can result.

SUMMARY

The power potential of an internal combustion engine can be better exploited while avoiding any damage, according to an embodiment of a method for controlling an internal combustion engine, comprising the steps of: operating the internal combustion engine, depending on a criterion, either in a normal mode in which the maximum torque produced by the internal combustion engine is restricted to a normal limit value or in a power mode in which the maximum torque produced is limited to a power limit value which is greater than the normal limit value, detecting at least one operating variable of the internal combustion engine which is representative of its combustion power, and operating the internal combustion engine in power mode as a function of the at least one operating variable.

According to another embodiment, a control device for an internal combustion engine, which can be operated, depending on a criterion, either in a normal mode in which the maximum torque produced by the internal combustion engine is restricted to a normal limit value, or can be operated in a power mode in which the maximum torque produced is limited to a power limit value which is greater than the normal limit value, may be embodied such that at least one operating variable of the internal combustion engine is detected which is representative of its combustion power, and the internal combustion engine is operated in power mode as a function of this at least one operating variable.

According to a further embodiment, the power limit value may be determined as a function of the at least one operating variable. According to a further embodiment, the power limit value may be decremented in the power mode. According to a further embodiment, the power limit value can be a dynamic variable and is decremented all the more the greater the operating variable is. According to a further embodiment, the power limit value can be held constant for a hold time period before decrementation. According to a further embodiment, the hold time period may be a dynamic variable which is reduced all the faster, the greater the operating variable is. According to a further embodiment, the power limit value can be incremented again after the internal combustion engine is reset from power mode into normal mode. According to a further embodiment, the power limit value can be incremented all the more the smaller the operating variable is in normal mode. According to a further embodiment, the power limit value may not exceed a predetermined maximum value. According to a further embodiment, the least one operating variable may be the combustion chamber temperature and/or the combustion pressure and/or the fuel mass flow and/or the fresh air mass flow which is metered by the internal combustion engine for combustion. According to a further embodiment, the criterion can be the setting of a gas pedal.

BRIEF DESCRIPTION OF THE DRAWINGS

The invention is explained below in greater detail on the basis of exemplary embodiments which refer to the enclosed drawings. The following drawings are shown in the figures:

FIG. 1 shows a schematic diagram of an internal combustion engine 1. To make the diagram clearer the engine is shown in simplified form.

DETAILED DESCRIPTION

Figure 1:
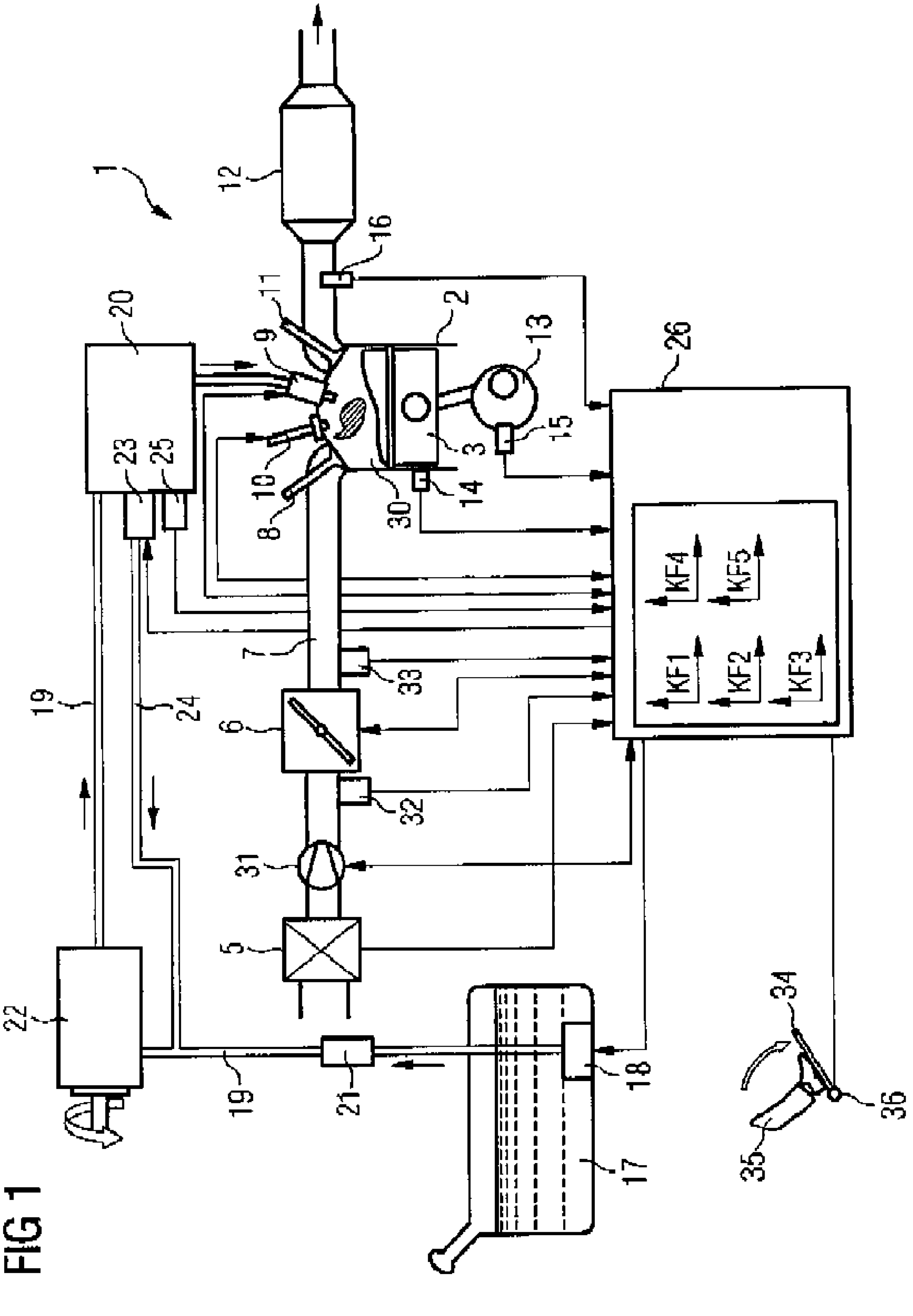
FIG. 1 a schematic diagram of an internal combustion engine.

In a control method in accordance with an embodiment the internal combustion engine, depending on a criterion, is either operated in a normal mode in which the maximum torque output of the internal combustion engine is restricted to a normal limit value, or is operated in a power mode in which the maximum torque output is restricted to a power limit value which is greater than the normal limit value. At least one operating variable of the internal combustion engine is detected which is representative of its combustion power. Combustion power is to be understood as the total energy which is released during combustion of the combustion mixture in the internal combustion engine per operating cycle. The operation of the internal combustion engine in power mode is undertaken depending on this at least one operating variable.

The invention is based on the knowledge that the power yields of the internal combustion engine with simultaneous protection against damage can be improved by the power mode being executed depending on an operating variable which is representative of the combustion power. The combustion power is a deciding factor for the temperature in the combustion chambers of the internal combustion engine and thereby for the thermal and also mechanical stresses on the components of the internal combustion engine. It is thus possible to adapt the power mode individually to the conditions actually obtaining.

In a further embodiment of the method, the power limit value is determined as a function of the at least one operating variable.

In this embodiment of the method it is possible to influence the power limit value itself as a function of the operating variable. This makes it possible to influence the level of maximum torque output even in power mode.

In accordance with further embodiments of a method, the power limit value is decremented in the power mode. In this case the power limit value can be a dynamic variable which is decremented all the more the greater the operating variable is or the higher the combustion power is.

In these embodiments of the method the highest torque is available immediately at the start of the power mode, which is decremented strongly or less strongly depending on the operating variable. It is the protection of the internal combustion engine which is of primary importance here.

In further embodiments of a method, the power limit value is held constant for a hold time period before decrementation. The hold time period can in this case be a dynamic variable which is reduced all the more quickly the larger the operating variable or the combustion power of the internal combustion engine is.

The fact that the power limit value is held at a constant level for a specific hold time period means that the driver has a higher torque available to them for a longer period. This allows the driving dynamics of a motor vehicle powered by the internal combustion engine to be improved.

In a further embodiment of the method, after the internal combustion engine is returned from power mode to normal mode, the power limit value is incremented again.

In this case, in accordance with a further embodiment, the power limit value can be incremented all the more the smaller the operating variable or the combustion power is in normal mode.

Further embodiments may guarantee a sufficiently long regeneration or cooling down phase of the internal combustion engine, especially of the combustion chambers, in normal mode. In such cases the power limit value decremented in the previous power mode is dynamically increased in the subsequent normal mode depending the operating variable. The smaller the operating variable is, i.e. the smaller the combustion power of the internal combustion engine is in normal mode, the greater is the incrementation of the power limit value. This is sensible insofar as the combustion chambers or the internal combustion engine cool down faster with a lower combustion power. The resulting improved cooling down or thermal regeneration of the internal combustion engine means that, with a subsequent switchover into the power mode, a higher torque can be requested without damage to the internal combustion engine.

In a further embodiment of the method, the power limit value does not exceed a predetermined maximum value.

The incrementation of the power limit value is thus limited by a maximum value. The maximum value can in this case be calibrated so that the maximum torque produced by the internal combustion engine does not result in any damage to the components of the internal combustion engine or to a power train assigned to the internal combustion engine.

In a further embodiment of the method, the operating variable can involve the combustion chamber temperature and/or the combustion pressure in the combustion chambers and/or fuel mass flow and/or fresh air mass flow which is metered by the internal combustion engine for combustion.

Said variables allow a very precise and immediate conclusion about the combustion power of the internal combustion engine to be drawn. To detect some of the variables sensors are already provided as standard in conventional internal combustion engines, so that no additional hardware needs to be installed and costs can be saved.

In a further embodiment of the method, a setting of the gas pedal which is assigned to the internal combustion engine is involved.

A control device for an internal combustion engine can be embodied so as to enable it to execute the above described methods.

As regards the advantages offered by this type of control device, the reader is referred to the statements made in relation to the method which apply in a similar fashion here.

The internal combustion engine 1 comprises at least one cylinder 2 and a piston 3 able to be moved up and down in the cylinder 2. The internal combustion engine 1 further comprises an induction tract, in which downstream of an induction opening 4 an air mass sensor 5, a compressor 31, a throttle flap 6, as well as a suction tube 7 are arranged. The compressor 31 can be the compressor of an exhaust gas turbocharger, a mechanical compressor or an electrically-operated compressor. In each case the compressor 31 includes suitable means for setting the compression power. Also arranged in the induction tract are two pressure sensors 32, 33—one in the suction tube, downstream from the throttle flap 6 and one upstream from the throttle flap 6 and downstream from the compressor 31. The induction tract opens out into a combustion chamber 30 delimited by the cylinder 2 and the piston 3. The fresh air needed for combustion is introduced via the induction tract into the combustion chamber 30, with the fresh air supply being controlled by opening and closing an inlet valve 8.

The internal combustion engine 1 shown here is an internal combustion engine 1 with direct fuel injection, in which the fuel needed for combustion is injected directly via an injection valve 9 into the combustion chamber 30. The injection valve 9 is for example an electromagnetic, piezoelectric or electromechanical injection valve. A spark plug 10 also extending into the combustion chamber 30 is used to initiate the combustion. The combustion exhaust gases are discharged via an exhaust valve 11 into an exhaust gas tract of the internal combustion engine 1 and cleaned by means of an exhaust gas catalytic converter 12 arranged there. The power is transferred to a power train of a motor vehicle (not shown) via a crankshaft 13 coupled to the piston 3. The internal combustion engine 1 also has a combustion chamber pressure sensor 14, or alternatively a combustion chamber temperature sensor, a rotational speed sensor 15 to detect the speed of the crankshaft 13 as well as a Lambda sensor 16 for measuring the exhaust gas composition.

Also assigned to the internal combustion engine 1 are a fuel tank 17 as well as a fuel pump 18 arranged within it. The fuel is fed by means of the pump 18 via a supply line 19 to a pressure reservoir 20. This reservoir is a common pressure reservoir 20 from which the injection valves 9 for a number of cylinders 2 are supplied with fuel under pressure. Also arranged in the supply line 19 are a fuel filter 21 and a high-pressure pump 22. The high-pressure pump 22 serves to supply the fuel delivered by the fuel pump 18 at relatively low pressure (appr. 3 Bar) to the pressure reservoir 20 at high pressure (typically up to 150-200 bar for otto engines). In such cases the high-pressure pump 22 is for example driven by corresponding coupling to the crankshaft 13. For controlling the pressure in the pressure reservoir 20 a pressure adjustment means 23, for example a pressure control valve or a mass flow control valve is arranged on the reservoir, via which the fuel in the pressure reservoir 20 can flow back via a return flow line 24 into the supply line 19 or the fuel tank 17. A pressure sensor 25 is also provided for monitoring the pressure in the pressure reservoir 20.

The internal combustion engine 1 is assigned a regulator device 26 which is connected via signal and data lines to all actuators and sensors. Implemented by software in the regulator device 26 are engine-map-based engine control functions (KF1 to KF5). Based on the measured values of the sensors and engine-map-based engine control functions, control signals are sent out to the actuators of the internal combustion engine 1. Thus the regulator device 26 is coupled via data and signal lines to the fuel pump 18, the pressure adjustment means 23, the pressure sensor 25, the air mass sensor 5, the compressor 31, the throttle flap 6, the pressure sensor 32, 33, the spark plugs 10, the injection valve 9, the combustion chamber pressure sensor 14, the rotational speed sensor 15 and the Lambda sensor 16.

The internal combustion engine 1 is assigned a gas pedal 34 which can be activated by a driver with his or her foot 35. The gas pedal 34 has an angle sensor 36 which detects the angle at which the gas pedal 34 is set and transmits this setting to the control device 26. The angle setting of the gas pedal 34 is interpreted by the control device 26 as a request for torque by the driver. The further the gas pedal 34 is pressed, the greater the torque requested by the driver.

A torque model is implemented by software in the control device 26. The torque model uses the torque requested by the driver as its starting point for computing the corrective signal for those actuators of the internal combustion engine 1 of which the setting or timing has an influence on the torque created by the internal combustion engine 1. With a supercharged otto engine this involves the actuators of the throttle flap 6 or of the compressor 31 for example. The greater the opening angle of the throttle flap 6 and the higher the compression power of the compressor 31 the greater is the volume of fresh air supplied to the internal combustion engine and thereby the torque produced. The torque produced can further also be influenced by changing the ignition time, which is set by corresponding activation of the spark plugs 10, or of the air-fuel ratio of the combustion gases, which is set by corresponding activation of the injection valves 9.

The internal combustion engine 1 can optionally be operated in a normal mode, in which the maximum torque is restricted by software to a normal limit value, or can be operated in a power mode, in which maximum torque is limited by software to a power limit value which is higher than the normal limit value. The overboosting of the maximum torque produced in the power mode is only available to a limited extent for a restricted time. The reason for the restricted time is primarily to protect the components. Permanent operation of the internal combustion engine 1 in power mode would lead to a thermal and mechanical overload of the internal combustion engine especially the cylinders 2, the pistons 3, the power train (not shown) and the exhaust gas tract. The higher torque in the power mode can for example be produced by corresponding activation of the compressor 31 and/or the throttle flap 6, in order to increase the measured fresh air mass flow by these means. As an alternative or in addition, an enrichment of the combustion gas mixture and a “advancing” of the ignition angle can be undertaken. The setting of the gas pedal 34 can in such cases serve as a possible checking criterion for activating the power mode. The control of the internal combustion engine 1 in the power mode and in the normal mode is explained in greater detail below.

Figure 2A:
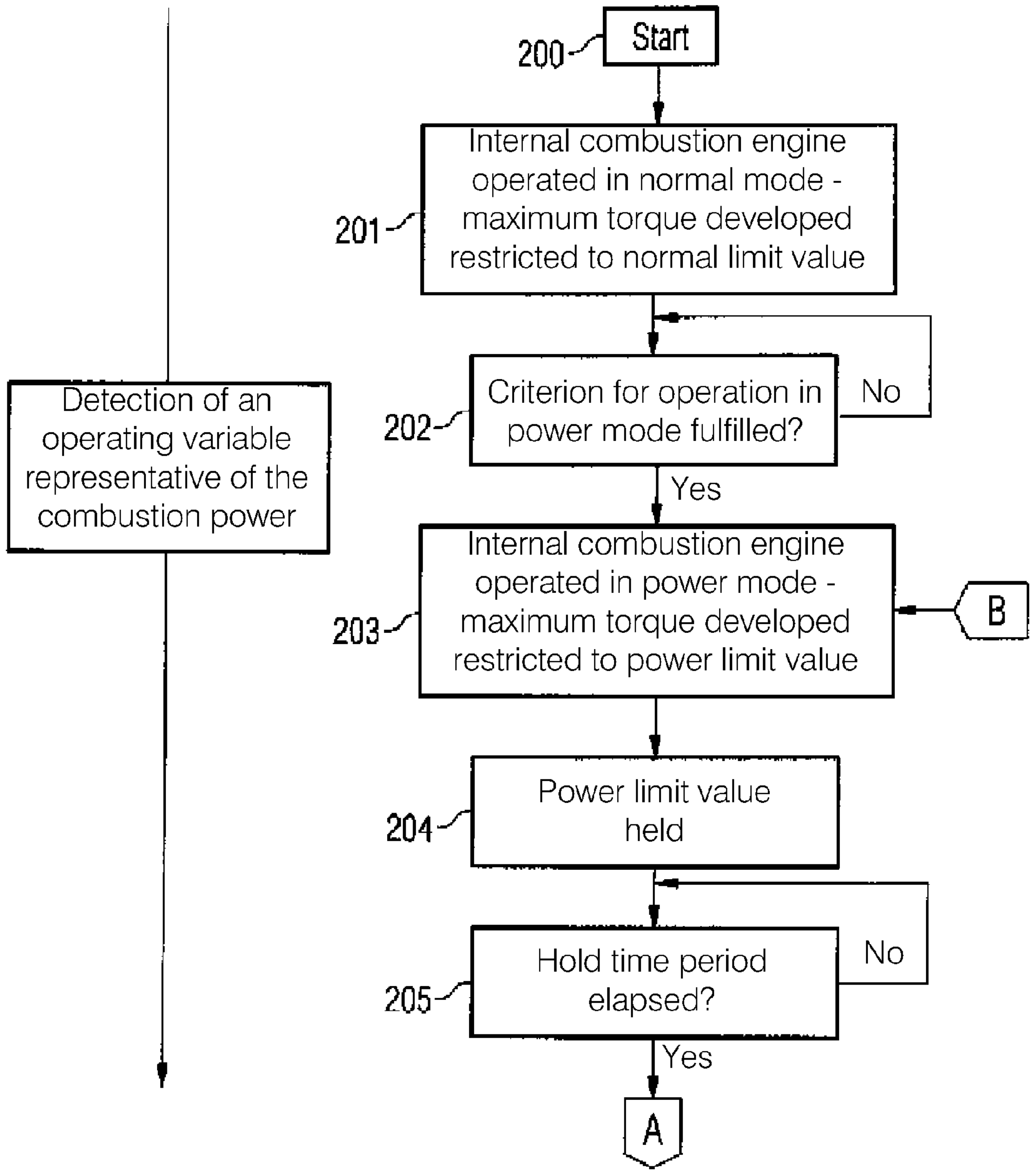
FIGS. 2A and 2B an exemplary embodiment of a control method in the form of a flowchart.
Figure 2B:
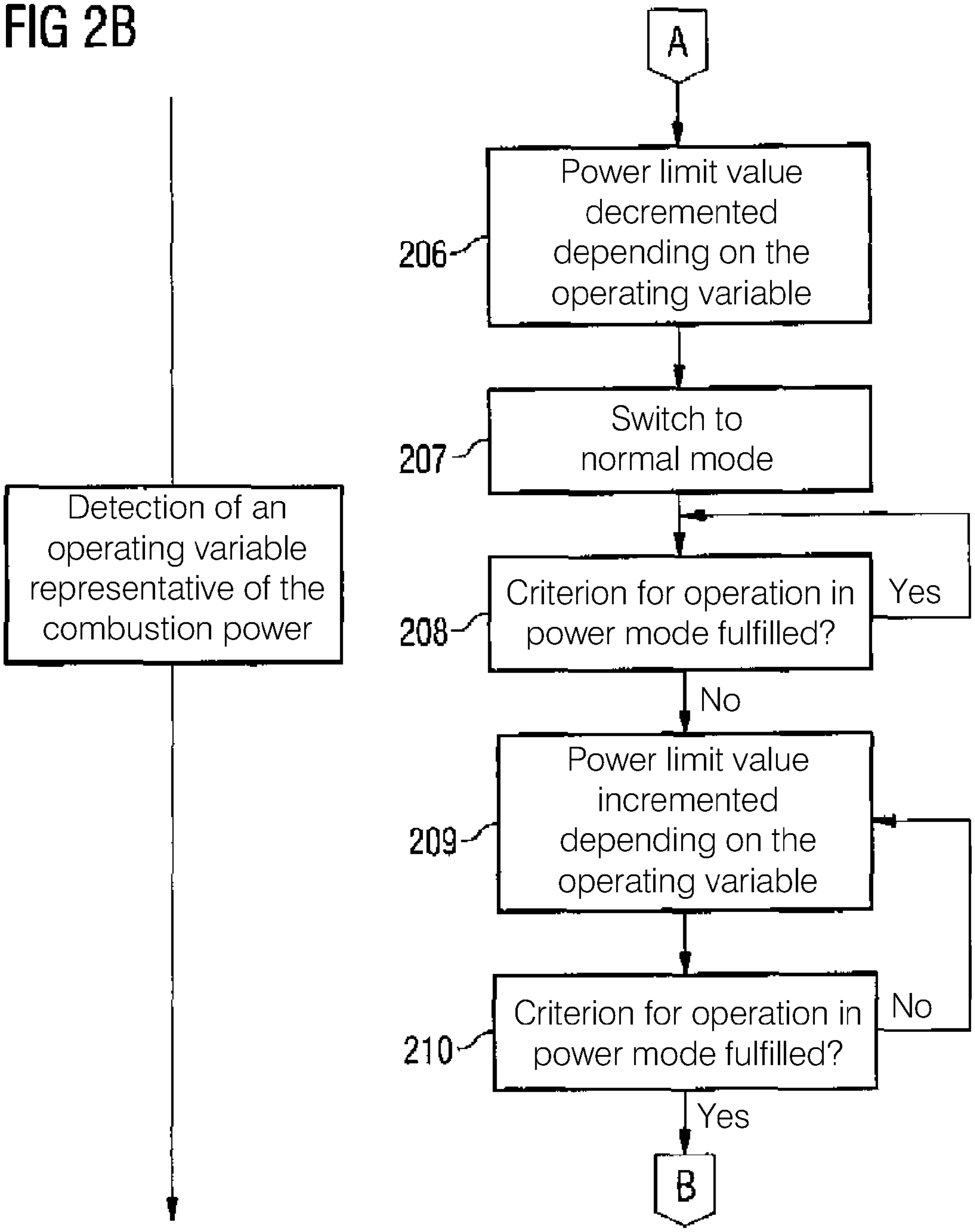

FIG. 2 shows an exemplary embodiment in the form of a flowchart of a control method for an internal combustion engine 1 described above. The method begins at step 200, when the ignition is switched on or the internal combustion engine 1 is started for example. Before this point in time the control device 26 detects an operating variable representative of the combustion power, which for example is measured by means of a sensor computed by means of a physical model. For the internal combustion engine 1 described above this operating variable can involve the pressure in the suction tube (measured by the pressure sensor 33), the fresh air mass flow (measured by the air mass sensor 5) or the injected mass flow of fuel (computed by the control device on the basis of the opening time of the injection valve 9 and the pressure in the pressure reservoir 20). With diesel engines it is preferably the metered fuel mass flow. The average combustion chamber pressure per combustion process measured by the combustion chamber pressure sensor 14 can also be used as the operating variable. Where the internal combustion engine 1 has a combustion chamber temperature sensor the value of this sensor can be used directly.

After the internal combustion engine 1 starts up, this engine is normally initially operated in step 201 in a normal mode, in which the maximum torque produced by the internal combustion engine 1 is limited to the normal limit value. This normal limit value lies below the actual maximum torque able to be produced by the internal combustion engine 1. The normal limit value is dimensioned such that a permanent torque delivery at the level of the normal limit value does not result in any damage to the internal combustion engine 1, such as overheating of the combustion chambers or of the exhaust gas tract.

A check is made in step 202 as to whether a criterion for operation of the internal combustion engine 1 in power mode is fulfilled. In power mode the maximum torque delivered by the internal combustion engine 1 is restricted to a power limit value which is greater than the normal limit value. The criterion for operation of the internal combustion engine 1 in power mode is for example fulfilled if a further operating variable of the internal combustion engine 1 indicates a request from the driver for higher torque. As has already been mentioned above, a request for increased torque from the driver can for example be detected by the gas pedal 34 being actuated by the driver beyond a specific threshold value. As an alternative for example in an otto engine the criterion can be fulfilled, if the opening angle of the throttle flap exceeds an opening angle threshold value. The request in step 202 is repeated until such time as the criterion is fulfilled.

Once the request in step 202 yields a positive result, in the step 203 the internal combustion engine 1 is switched from normal mode into power mode, with the limit for the maximum torque delivered being increased from the normal limit value to the power limit value. The power limit value in this case is dimensioned so that the internal combustion engine 1 can be operated at this power limit value without sustaining damage for a certain period of time. In the power mode the driver thus has an increased maximum torque available to them for a restricted period. When the internal combustion engine 1 is first put into the power mode the power limit value is initialized with a predetermined initial value. This can for example be determined from an engine map dependent on the speed and the volume flow of fresh air. Further dependencies, for example the coolant temperature, are also conceivable.

As soon as the internal combustion engine 1 is put into the power mode, a timer is started. The power limit value is held in step 204 at its initial value until, in step 205, it is detected that a predetermined hold time period has elapsed. The driver thus has available to them for the hold time period a constant maximum torque delivery.

If it is detected in step 205 that the hold time period has elapsed, in step 206 the power limit value is decremented depending on the representative operating variable for the combustion power. The decrementation in this case is all the greater, the higher the combustion power of the internal combustion engine 1 is. Thus with an otto engine the power limit value is decremented all the faster or all the more, the higher is the fresh air mass flow measured by the air mass sensor. With a diesel engine the power limit value is decremented all the more or all the faster the higher is the volume of fuel injected per working cycle or the fuel mass flow. The underlying idea is to be seen as the higher the combustion power of the internal combustion engine 1 is, the faster the temperature in the combustion chambers of the internal combustion engine 1 increases. The power limit value is thus decremented faster or more, the faster the temperature in the combustion chambers increases. This guarantees that despite a higher torque delivery there is no resulting damage to the internal combustion engine 1.

In step 207 the internal combustion engine 1 is returned from the power mode to the normal mode again. The return can either be caused by the criterion for operation in the power mode no longer being fulfilled or by the power limit value having been decremented to a lower threshold value, which lies slightly above the normal limit value. In this case there is a return to the normal mode to protect the internal combustion engine 1.

In step 208 a further check is made that the criterion for operation in the power mode is still fulfilled. This check is relevant for the case in which the internal combustion engine 1 has been shifted from power mode into normal mode since the power limit value has been decremented down to the lower threshold value, but the criterion for operation in the power mode is still fulfilled. In the case in which the return to normal mode has occurred because of the non-fulfillment of the criterion for operation in power mode the process can continue immediately at step 209.

With a positive result of the request in step 208 the criterion for operation in the power mode continues to be fulfilled. This can for example be the case if the driver keeps the gas pedal 34 pressed beyond the threshold value for detection of the power mode, although the motor vehicle is already switched back into normal mode for safety reasons. In this case this request for increased torque by the driver is ignored and the motor vehicle remains in the normal mode. This is thus sensible since the internal combustion engine 1 has already been switched over, in order to protect its components, from power mode into normal mode and is designed to prevent the internal combustion engine 1 being put back into power mode without prior thermal regeneration.

For a negative result of the request in step 208, i.e. if the criterion for operation of the internal combustion engine 1 in power mode is not fulfilled, the process continues with step 209 in which the power limit value is incremented depending on the operating variable representative for the combustion power. The power limit value is incremented in this case starting from the level that it had on transition from the power mode into the normal mode. The incrementation in this case is all the greater or all the quicker the lower the combustion power or the operating variable is in normal mode. The incrementation phase according to step 209 can also be referred to as the regeneration phase, during which the internal combustion engine 1 or the combustion chambers 30 are thermally regenerated. The regeneration phase is all the shorter, the greater the level of the power limit value on transition from power mode into normal mode or the lower the combustion power or the operating variable in the regeneration phase is.

Even during the regeneration phase, meaning during the incrementation of the power limit value, a check is made in step 210 as to whether the criterion for operation in power mode is fulfilled. With a negative result of the request in step 210 the internal combustion engine 1 continues to be operated in the normal mode and the power limit value is incremented up to a maximum value. The maximum value is dimensioned in this case such that the internal combustion engine 1 is not overstressed. If however in step 210 the criterion for operation in power mode is fulfilled, the method is continued at step 203, which means that the internal combustion engine 1 is put back into power mode again. By contrast with the first switch into power mode after starting the internal combustion engine 1 however, the power limit value is not initialized here with the initialization value but with the current level of the power limit value. This means that, if the criterion for operation in power mode occurs before a complete incrementation of the power limit value up to the maximum value (complete regeneration of the internal combustion engine), the power limit value has a lower level. This is justifiable since the regeneration, meaning the incrementation up to the maximum value, was still not completed and the maximum torque delivered is thus minimized to a lower power limit value. The result of this is that the power mode can only be operated for a shorter time or at a lower combustion power. Both lead to a comprehensive protection of the internal combustion engine 1 against excessive stress.

It is pointed out that the exemplary embodiment in accordance with FIG. 2 can also be executed without steps 204 and 205, with the decrementation of the power limit value beginning immediately after the switching of the internal combustion engine 1 into power mode. In this case is the dynamic of the internal combustion engine 1 is slightly restricted, but greater emphasis is placed on component protection.

It is further pointed out that the hold time period for which the power limit value is held in step 205 to a constant level can be dependent on the operating variable. The greater the combustion power or the operating variable is, the more sharply the hold time period is reduced, starting from a second initial value. This means, that with higher thermal stress on the internal combustion engine 1 the hold time period for which the internal combustion engine 1 can be operated at a constant torque level is shorter. This too contributes to an improved durability of the internal combustion engine 1.

Although the exemplary embodiment of the internal combustion engine 1 deals with an otto engine, the invention is also able to be applied correspondingly to diesel engines. The invention is also applicable to otto engines with gasoline direct injection.

What is claimed is:

1. A control device for an internal combustion engine, which can be operated, depending on a criterion, either in a normal mode in which the maximum torque produced by the internal combustion engine is restricted to a normal limit value, or can be operated in a power mode in which the maximum torque produced is limited to a power limit value which is greater than the normal limit value, with the control device being embodied such that at least one operating variable of the internal combustion engine is detected which is representative of its combustion power, and the internal combustion engine is operated in power mode as a function of this at least one operating variable.

2. The device according to claim 1, wherein the control device is further operable to determine the power limit value as a function of the at least one operating variable.

3. The device according to claim 2, wherein the control device is further operable to decrement the power limit value in the power mode.

4. The device according to claim 3, wherein the power limit value is a dynamic variable and the control device is further operable to decrement the power limit value all the more the greater the operating variable is.

5. The device according to claim 3, wherein the control device is further operable to hold the power limit value constant for a hold time period before decrementation.

6. The device according to claim 5, wherein the hold time period is a dynamic variable which is reduced all the faster, the greater the operating variable is.

7. The device according to claim 3, wherein the control device is further operable to increment the power limit value again after the internal combustion engine is reset from power mode into normal mode.

8. The device according to claim 7, wherein the control device is further operable to increment the power limit value all the more the smaller the operating variable is in normal mode.

9. The device according to claim 7, wherein the power limit value is not exceeding a predetermined maximum value.

10. A method for controlling an internal combustion engine, comprising the steps of:

operating the internal combustion engine, depending on a criterion, either in a normal mode in which the maximum torque produced by the internal combustion engine is restricted to a normal limit value or in a power mode in which the maximum torque produced is limited to a power limit value which is greater than the normal limit value, detecting at least one operating variable of the internal combustion engine which is representative of its combustion power, and operating the internal combustion engine in power mode as a function of the at least one operating variable.

11. The method according to claim 10, wherein the power limit value is determined as a function of the at least one operating variable.

12. The method according to claim 11, wherein the power limit value is decremented in the power mode.

13. The method according to claim 12, wherein the power limit value is a dynamic variable and is decremented all the more the greater the operating variable is.

14. The method according to claim 12, wherein the power limit value is held constant for a hold time period before decrementation.

15. The method according to claim 14, wherein the hold time period is a dynamic variable which is reduced all the faster, the greater the operating variable is.

16. The method according to claim 12, wherein the power limit value is incremented again after the internal combustion engine is reset from power mode into normal mode.

17. The method according to claim 16, wherein the power limit value is incremented all the more the smaller the operating variable is in normal mode.

18. The method according to claim 16, wherein the power limit value is not exceeding a predetermined maximum value.

19. The method according to claim 10, wherein the least one operating variable is the combustion chamber temperature and/or the combustion pressure and/or the fuel mass flow and/or the fresh air mass flow which is metered by the internal combustion engine for combustion.

20. The method according to claim 10, wherein the criterion is the setting of a gas pedal.

* * * * *

UNITED STATES PATENT AND TRADEMARK OFFICE

CERTIFICATE OF CORRECTION

PATENT NO. : 7,715,973 B2 
APPLICATION NO. : 12/164261
DATED : May 11, 2010
INVENTOR(S) : Baris Erol It is certified that error appears in the above-identified patent and that said Letters Patent is hereby corrected as shown below:

Title page, Item [30] Please correct the Foreign Application Priority Data as follows:

~~Jun. 6, 2007 (DE) ............... 10 2007 026 408~~
Jul. 6, 2007 (DE) ............... 10 2007 031 484

Signed and Sealed this

Seventeenth Day of August, 2010

David J. Kappos
*Director of the United States Patent and Trademark Office*